United States Patent [19]
Matui

[11] Patent Number: 5,345,452
[45] Date of Patent: Sep. 6, 1994

[54] ADAPTIVE EQUALIZER FOR REMOVING NONLINEAR DISTORTIONS FROM DIGITAL SIGNALS

[75] Inventor: Hitosi Matui, Tokyo, Japan

[73] Assignee: NEC Corporation, Tokyo, Japan

[21] Appl. No.: 890,267

[22] Filed: May 29, 1992

[30] Foreign Application Priority Data

May 29, 1991 [JP] Japan .................................. 3-125759

[51] Int. Cl.$^5$ ............................................. G06F 11/10
[52] U.S. Cl. ....................................... 371/43; 360/45; 371/44
[58] Field of Search ...................... 360/45; 371/43, 44, 371/45

[56] References Cited

U.S. PATENT DOCUMENTS

| | | | |
|---|---|---|---|
| 5,089,917 | 2/1992 | Kanota et al. | 371/43 |
| 5,220,570 | 6/1993 | Lou et al. | 371/43 |
| 5,263,033 | 11/1993 | Seshadri | 371/43 |

OTHER PUBLICATIONS

G. David Forney, Jr., "Maximum–Likelihood Sequence Estimation of Digital Sequences in the Presence of Intersymbol Interference," IEEE Trans. Inform. Theory, vol. IT-18, No. 3, May, 1972.

Alexandra Duel–Hallen et al, "Delayed Decision-Feedback Sequence Estimation", IEEE Tran. commu. pp. 428, vol. 37, May 1989.

Kevin Fisher, John Cioffi, and C. M. Melas, "An Adaptive DFE for Storage Channels Suffering from Nonlinear ISI", Globalcom 1989, 53.7.1.

*Primary Examiner*—Vincent P. Canney
*Attorney, Agent, or Firm*—Sughrue, Mion, Zinn, Macpeak & Seas

[57] ABSTRACT

An adaptive equalizer of the present invention equalizes a data symbol sequence containing intersymbol interference and nonlinear distortions extending over several symbols, e.g., a digital signal from the read head of a high density magnetic recording and playback apparatus, thereby producing an equalized output free from such distortions. Presumed value storing means stores a plurality of presumed value signals read out of the combinations of an equalization address signal and a Viterbi transition symbol sequence signal. Error calculating means outputs a plurality of error signals representative of differences between the plurality of presumed value signals and an input data symbol. Viterbi algorithm equalizing means executes equalization according to a Viterbi algorithm and by using the plurality of error signals as branch metrics, thereby producing a presumed symbol associated with the input data symbol, the equalization address signal, and a correction address signal. Correcting means updates the presumed value signal of the presumed value signal storing means designated by the correction address signal with the input data symbol.

5 Claims, 8 Drawing Sheets

X = 1 or 0

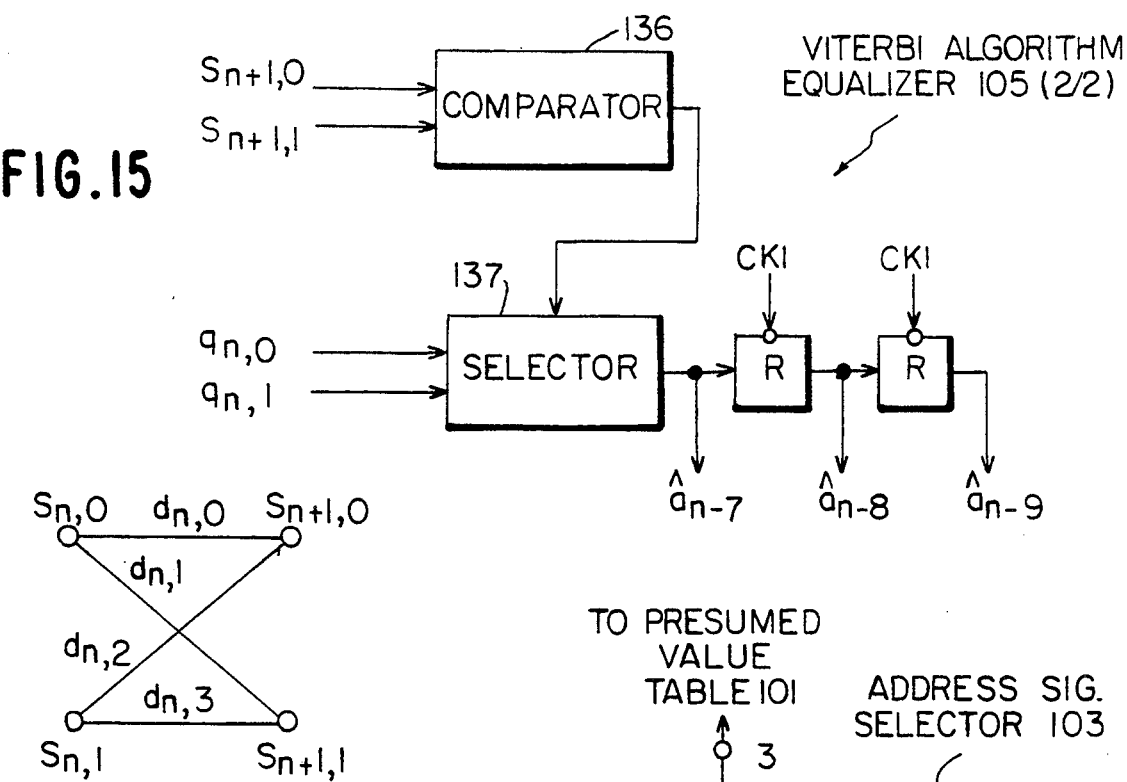
FIG.15
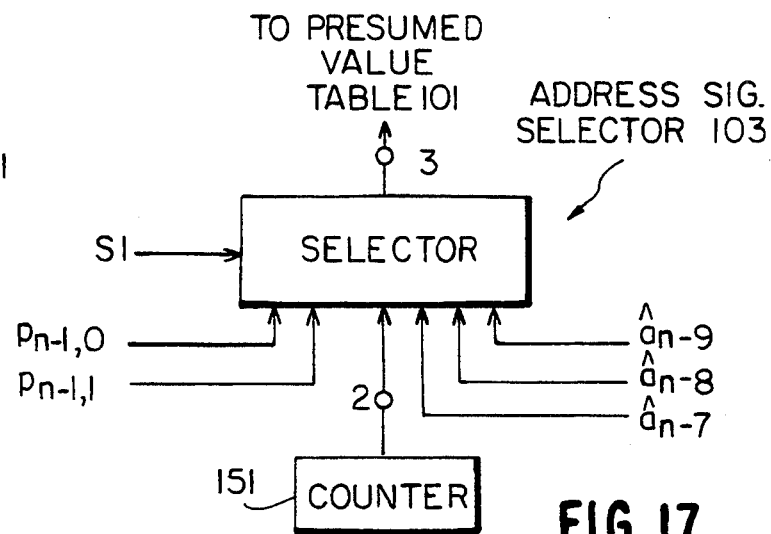
FIG.16
FIG.17
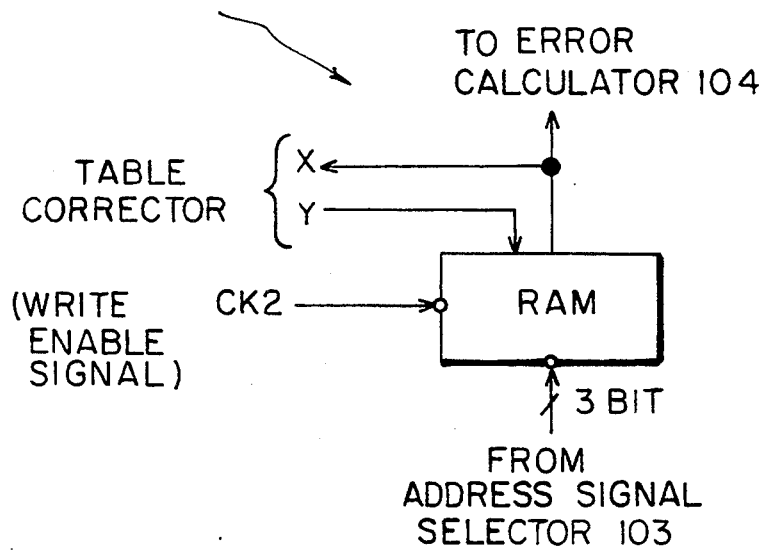
FIG.18

ADAPTIVE EQUALIZER FOR REMOVING NONLINEAR DISTORTIONS FROM DIGITAL SIGNALS

BACKGROUND OF THE INVENTION

1. Field of the Invention

The present invention relates to an automatic equalizer for automatically equalizing digital signals containing nonlinear distortions and, more particularly, to an automatic equalizer for automatically equalizing a digital signal experiencing from nonlinear distortions, e.g., a digital signal from a read head of a high density magnetic recording apparatus, to thereby faithfully reproduce an original digital signal free from the nonlinear distortions.

2. Description of the Prior Art

It has been customary with a magnetic recording apparatus for digital signals to use a linear equalizer implemented by linear elements in removing distortions from the output of a read head. The linear equalizer is satisfactory in the case of signal reproduction with a low density digital signal storing apparatus. However, when it comes to signal reproduction with a high density storing apparatus, the conventional linear equalizer cannot remove distortions due to intersymbol interference since not only such distortions but also nonlinear distortions particular to the apparatus increase. Typical of nonlinear distortions is a peak shift, i.e., a shift of the peak of a data symbol read out on the time axis.

To equalize the read signal including the abovementioned distortions due to intersymbol interference and nonlinear distortions, use may be made of an equalizer using a Viterbi algorithm as proposed in G. David FORNEY, JR, "Maximum-Likelihood Sequence Estimation of Digital Sequences in the Presence of Intersymbol Interference, "IEEE Trans. Inform. Theory, vol. IT-18, No. 3, May, 1972. The approach applied to this equalizer consists of preparing presumed value signals containing distortions of various kinds of symbol sequences, and selecting as an equalized output symbol sequence a presumed symbol sequence having the smallest sum of errors between the sum of the presumed estimate signals and the symbol sequence of the input digital signal, i.e., signal read out on a trellis transition diagram.

While this approach is desirable for the equalization of digital signals containing nonlinear distortions, it is not feasible for the output of a digital VTR (Video Tape Recorder) or similar high density, high speed storing device since it involves agreat amount of calculations.

To reduce the amount of calculations, the above-stated equalizing method using the Viterbi algorithm (referred to as a Viterbi decoding method hereinafter) may be combined with the principle of a decision feedback equalizer to implement an intermediate characteristic (see Alexandra Duel—Hallen et al, "Delayed Decision-Feedback Sequence Estimation", IEEE Tran. commu. pp. 428, vol. 37, May, 1989). This scheme equalizes the former half of the impulse response including a precursor component by a procedure similar to the Viterbi equalizing method and equalizes the latter half by a procedure similar to a decision feedback equalizing method, thereby reducing the amount of calculations by a noticeably degree. However, the problem is that such a composite scheme is slightly inferior to the Viterbi decoding method with respect to equalizing ability and cannot remove distortions other than linear distortions.

There has also been proposed a decision feedback type equalizer capable of removing both the linear distortions and the nonlinear distortions (see Kevin Fisher, John Cioffi, and C. M. Melas, "An Adaptive DFE for Storage Channels Suffering from Nonlinear ISI," Globalcom 1989, 53.7.1). This type of equalizer can follow even the changes in distortions with respect to time by sequentially updating the contents of a RAM (Random Access Memory) with input digital signals. However, such an equalizer cannot remove nonlinear distortions from the precursor components of impulse responses due to the nature of the decision feedback equalizing method.

BRIEF SUMMARY OF THE INVENTION

Object of the Invention

It is therefore an object of the present invention to provide an equalizer capable of removing distortions due to intersymbol interference and nonlinear distortions from digital signals read out of a high density magnetic storing apparatus, particularly an adaptive automatic equalizer achieving an equalizing ability comparable with that of the conventional Viterbi decoding method with a smaller amount of calculations, and following even changes in distortions with respect to time.

SUMMARY OF THE INVENTION

An adaptive equalizer of the present invention equalizes a data symbol sequence containing intersymbol interference and nonlinear distortions extending over several symbols, e.g., a digital signal from the read head of a high density magnetic recording and playback apparatus, thereby producing an equalized output free from such distortions. Presumed value storing means stores a plurality of presumed value signals read out of the combinations of an equalization address signal and a Viterbi transition symbol sequence signal. Error calculating means outputs a plurality of error signals representative of differences between the plurality of presumed value signals and an input data symbol. Viterbi algorithm equalizing means executes equalization according to a Viterbi algorithm and by using the plurality of error signals as branch metrics, thereby producing a presumed symbol associated with the input data symbol, the equalization address signal, and a correction address signal. Correcting means updates the presumed value signal of the presumed value signal storing means designated by the correction address signal with the input data symbol.

BRIEF DESCRIPTION OF THE DRAWINGS

The above-mentioned and other objects, features and advantages of the present invention will become more apparent by reference to the following detailed description of the invention taken in conjunction with the accompanying drawings, wherein:

FIGS. 13, 14 and 15 are schematic block diagrams each showing part of the embodiment;

FIG. 16 is a Viterbi transition diagram particular to the embodiment;

FIGS. 17, 18 and 19 are schematic block diagrams each showing part of the embodiment;

GENERAL DESCRIPTION

The equalization principle of the present invention will be described by use of an input signal model (equalization principle model). The equalization principle model assumes a precursor component and a postcursor component of impulse response each having a length of one symbol and the following input signals to an equalizer.

Figure 1:
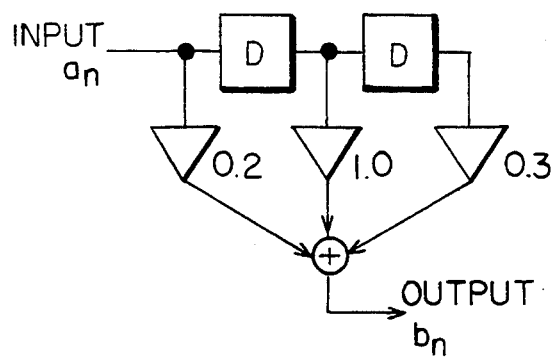
FIG. 1 is a block diagram schematically showing a linear distortion generation circuit for describing the principle equalization in accordance with the present invention.
Figure 2:
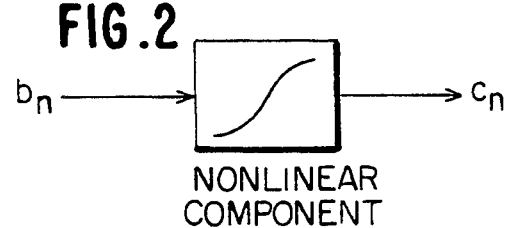
FIG. 2 is a block diagram schematically showing a nonlinear distortion generation circuit for describing the principle of equalization in accordance with the present invention.
Figure 3:
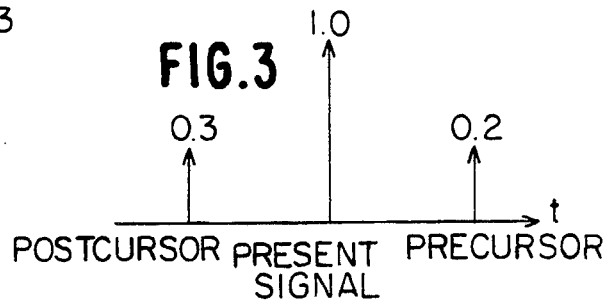
FIG. 3 shows an impulse response signal sequence including linear distortions with which the equalizer of the invention deals.

An input signal in the form of a data symbol sequence of binary codes is distorted linearly by a circuit shown in FIG. 1 and, further, distorted nonlinearly by a nonlinear element having a characteristic shown in FIG. 2. The impulse response signal sequence undergone linear distortion is depicted in FIG. 3. An input data symbol sequence $a_n$ (see FIG. 1), an output $b_n$ (see FIG. 1) suffering from linear distortion and derived from the input $a_n$, and an output $c_n$ (see FIG. 2) suffering from nonlinear distortion and derived from the output $b_n$ are shown in TABLE 1 below. As TABLE 1 indicates, the output $c_n$ is determined by the combination of three symbols $a_{n-2}$, $a_{n-1}$ and $a_n$ and, therefore, has one of $2^3$ i.e., eight different values.

TABLE 1

| INPUT SIGNAL $a_{n-2}, a_{n-1}, a_n$ | OUTPUT $b_n$ | OUTPUT $c_n$ |
|---|---|---|
| 000 | 0 | 0 |
| 001 | 0.2 | 0.1 |
| 010 | 1.0 | 1.0 |
| 011 | 1.2 | 1.3 |
| 100 | 0.3 | 0.2 |
| 101 | 0.5 | 0.4 |

TABLE 1-continued

| INPUT SIGNAL $a_{n-2}, a_{n-1}, a_n$ | OUTPUT $b_n$ | OUTPUT $c_n$ |
|---|---|---|
| 110 | 1.3 | 1.5 |
| 111 | 1.5 | 1.8 |

Figure 4:
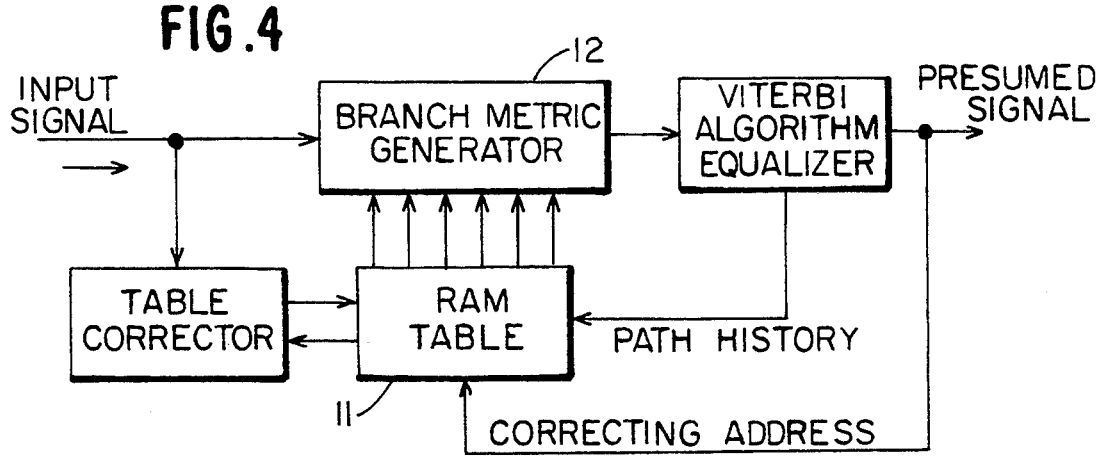
FIG. 4 is a block diagram schematically showing the basic construction of the equalizer of the invention.

FIG. 4 shows the basic construction of an equalizer in accordance with the present invention. A RAM table 11 included in the equalizer stores the contents of TABLE 1 shown above.

Figure 5:
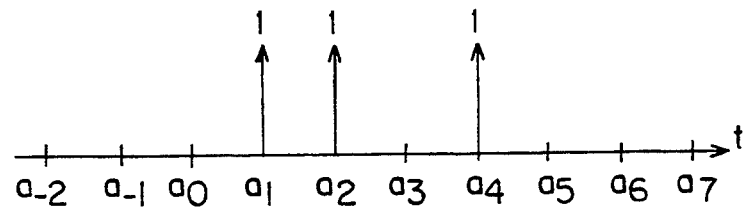
FIG. 5 shows a symbol sequence of an input digital signal applied to the equalizer of the invention and free from distortions.
Figure 6:
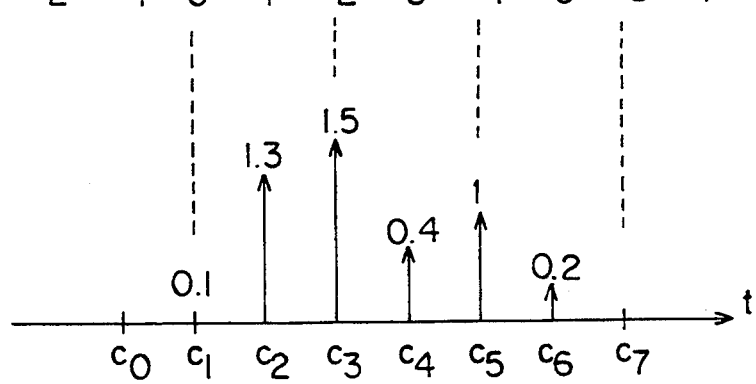
FIG. 6 shows a symbol sequence of an input digital signal suffered from distortions.

FIG. 5 shows an input symbol sequence $a_{-2}$ to $a_7$ "0,0,0,1,1,0,1,0,0,0". This symbol sequence changes into a symbol sequence $c_1$ to $c_7$ shown in FIG. 6, i.e., "0.1,1.3,1.5,0.4,1,0.2,0" due to distortion. The symbol sequence of FIG. 6 is applied to the equalizer. Every time a data symbol $a_n$ arrives at the equalizer, a branch metric generator 12 shown in FIG. 4 produces a square of a difference between the input symbol $a_n$ and an output $c_n$ of the RAM table 11 as a branch metric. Specifically, four of the eight values $c_n$ stored in the RAM table 11 or TABLE 1 are fed to the branch metric generator 12 at a time. Selecting four values $c_n$ at a time is advantageous in that a Viterbi algorithm equalizer is capable of executing equalization with the same trellis transition diagram as used with the combination of symbols $a_{n-1}$ and $a_n$ by using a symbol $a_{n-2}$ which is known from path history.

Figure 7:
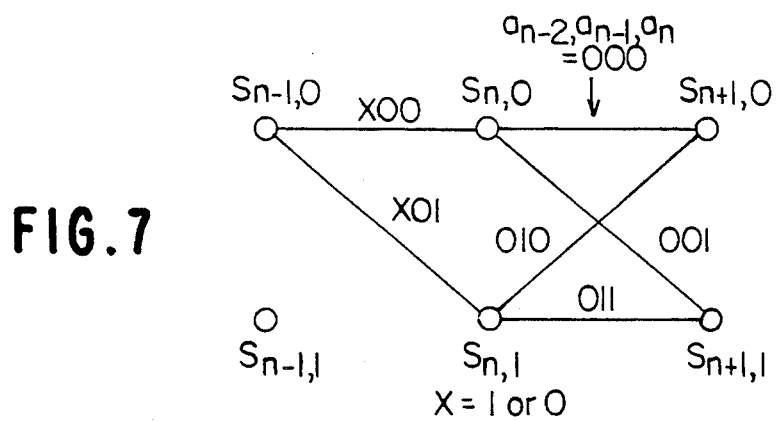
FIG. 7 shows an example of trellis transition diagrams for describing the equalization particular to the invention.
Figure 8:
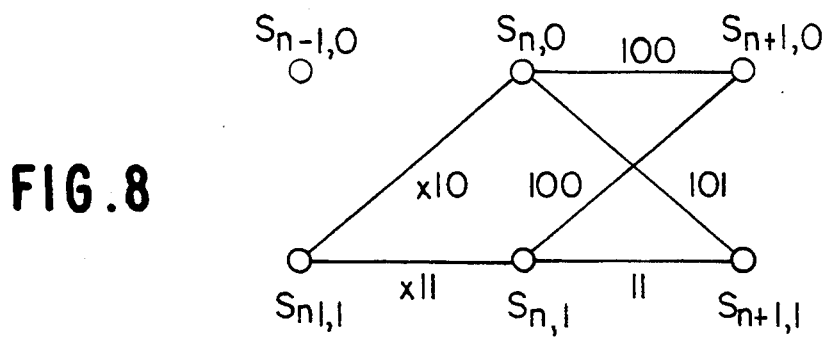
FIG. 8 shows another specific trellis transition diagram.

The four branch metrics produced by the branch metric generator 12 are equalized by the Viterbi algorithm equalizer using the Viterbi algorithm. It can be seen that the symbol $a_{n-2}$ is "0" when, in trellis diagrams shown in FIGS. 7 and 8, the branch connected to a state $S_{n,0}$ ("n" and "0" of the suffix indicate time and path metric state, respectively) or a state $S_{n,1}$ is from a state $S_{n-1,0}$, or it is "1" when the branch connected to the state $S_{n,0}$ is from a state $Sn_{l,l}$.

The result of Viterbi algorithm equalization derived from the symbol sequence of FIG. 6 is shown in branch metrics and path metrics in TABLE 2 below and in a trellis transition diagram in FIG. 9.

TABLE 2

| TIME | 1 | 2 | 3 | 4 | 5 | 6 | 7 |
|---|---|---|---|---|---|---|---|
| INPUT SIGNAL | 0.1 | 1.3 | 1.5 | 0.4 | 1 | 0.2 | 0 |
| BRANCH METRIC 0 | 0.01 | 1.69 | 1.69 | 0.04 | 1 | 0 | 0 |
| BRANCH METRIC 1 | 0 | 1.44 | 1.21 | 0 | 0.81 | 0.04 | 0.01 |
| BRANCH METRIC 2 | 0.81 | 0.09 | 0 | 1.21 | 0 | 1.69 | 1 |
| BRANCH METRIC 3 | 1.44 | 0 | 0.09 | 1.96 | 0.09 | 1.96 | 1.69 |
| PATH METRIC 0 | 0.01 | 0.09 | 0 | 0.04 | 0 | 0 | 0 |
| PATH METRIC 1 | 0 | 0 | 0.09 | 0 | 0.09 | 0.04 | 0.01 |

Assume that the four branch metrics of interest are $d_{n,0}$ to $d_{n,3}$ respectively associated with the branch between $S_{n,0}$ and $S_{n+1,0}$, the branch between $S_{n,1}$ and $S_{n+1,1}$, the branch between $S_{n,1}$ and $S_{n+1,0}$, and the branch between $S_{n,1}$ and $S_{n+1,1}$. As shown in FIG. 9, when the output $c_1$ (value of 0.1) is inputted, the branch metric $d_{1,0}$ is $(0.1-0)^2$ i.e. 0.01 (time 1 and branch 0, TABLE 2) since $c_1$ of TABLE 1 associated with the symbol sequence $(a_{-1}, a_0, a_1)$ of (0,0,0) is "0". The branch metric $d_{1,1}$ is $(0.1-0.1)^2$ i.e. 0 since the symbol sequence $(a_{-1}, a_0, a_1)$ is (0,0,1). Such a procedure is repeated with all the branch metrics to produce the branch metrics associated with times 1–7 shown in TABLE 2.

Path metrics $S_{n,0}$ and $S_{n,1}$ are determined by the following procedure. First, 0 is set in $S_{1,0}$ and $S_{1,1}$. For $S_{2,0}$, $S_{1,0}+d_{1,0}$ and $S_{1,1}+d_{1,2}$ are compared, and then smaller one of them is selected as a survived path while the other is discarded. Here, since $S_{1,0}+d_{1,0}=0.1$ and $S_{1,1}+d_{1,2}=0.81$, $S_{2,0}$ is 0.1 and, therefore, the path of $d_{1,0}$ survives. This procedure is repeated to produce a transition shown in FIG. 9. Finally, the input symbols are determined by trace-back. First, $S_{8,0}$ and $S_{8,1}$ are compared, and a smaller one of them, $S_{8,0}$, is selected. The trace-back is effected over the past six symbols. Since the resulting path $(a_{-1}, a_0, a_1)$ is $(0,0,1)$, $a_0$ is determined to be 0. While, ideally, the trace-back should be executed over an infinite number of symbols, it is known that the trace-back over several symbols suffices in the illustrative embodiment.

The equalization over three symbols as stated above is practicable with only four branch metrics in constrast to $2^3=8$ branch metrics needed to execute the conventional Viterbi decoding method. This correspondingly reduces the amount of iterative calculations. Such an effect becomes more prominent with the decrease in the number of branch metrics.

The data from the RAM table 11 are updated so as to effect optimum equalization at all times with no regard to the time-varying distortion. Specifically, a presumed symbol sequence having a determined symbol sequence delayed by R symbols as a correction RAM address signal is outputted. By using input data symbols $c_{n-R}$ and the value of the RAM table 11 indicated by the correction RAM address signal, a table corrector, FIG. 4, performs an operation on the basis of the following algorithm;

$$X \leftarrow \mu c_{n-R}+(1-\mu) X$$

where X is the data of the RAM address, and $\mu$ is a correction factor greater than or equal to 0 and smaller than or equal to 1. Then, the table corrector updates the data stored in the RAM address of the RAM table 11 of interest.

DETAILED DESCRIPTION

Figure 10:
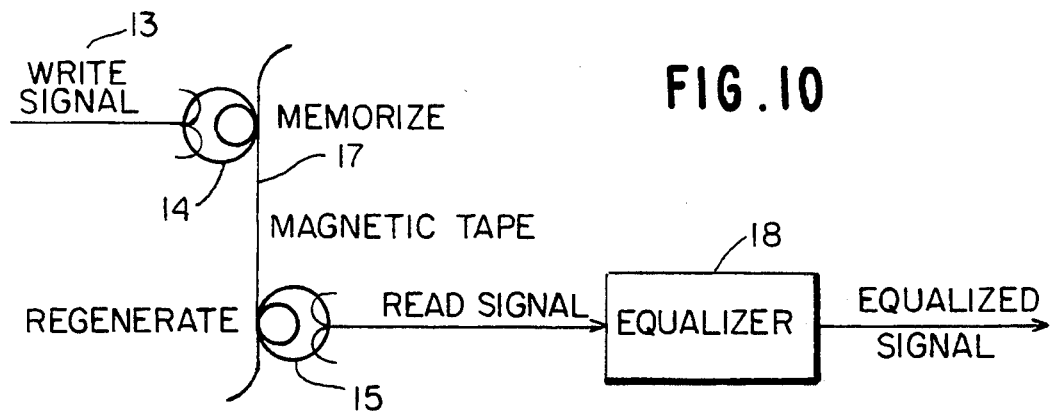
FIG. 10 is a block diagram schematically showing a magnetic recording circuit including the equalizer of the invention.

Referring to FIG. 10, a magnetic recording circuit including an equalizer of the present invention is shown in a schematic block diagram. A write signal 13 is recorded in a magnetic tape 17 for high density digital VTR by a write head 14. The signal recorded in the magnetic tape 17 is read out by a read head 15 and then applied to an equalizer 18 of the invention as a current. The signal read out of the tape 17 involves distortions due to intersymbol interference and nonlinear characteristic which are, in turn, ascribable to the limited frequency band, as discussed earlier.

Figure 11:
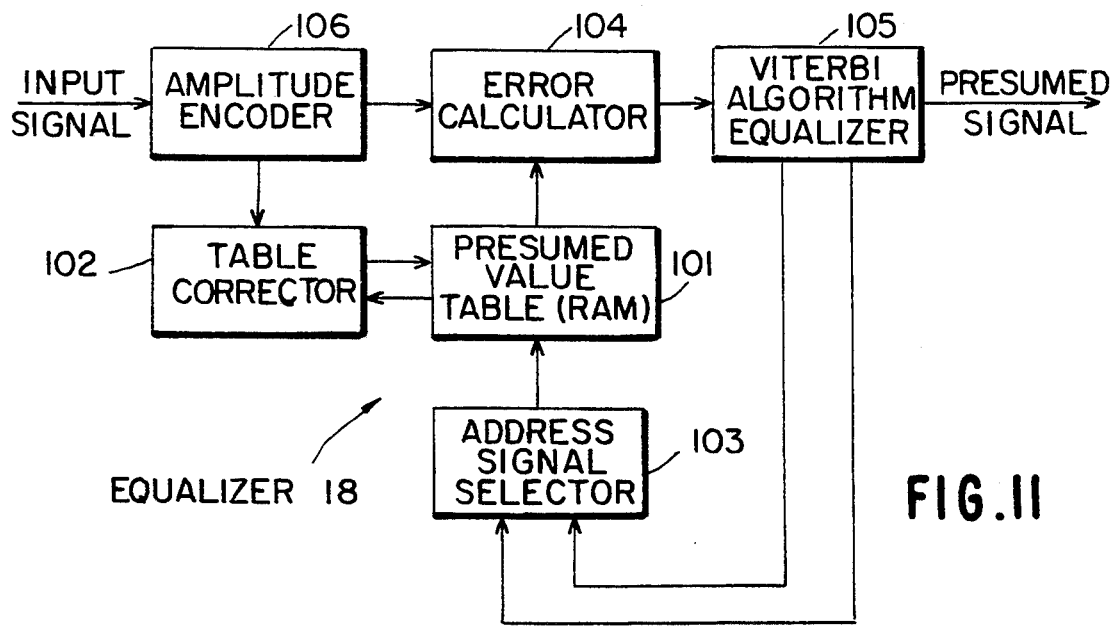
FIG. 11 is a block diagram schematically showing a preferred embodiment of the equalizer in accordance with the invention.

FIG. 11 shows a preferred embodiment of the equalizer 18 in accordance with the present invention. Assume that the digital signal to be applied to the equalizer 18 is a binary signal, that both the precursor component and the postcursor component of impulse response have a length of one symbol, and that a single storage implements presumed signal storing sections.

Figure 13:
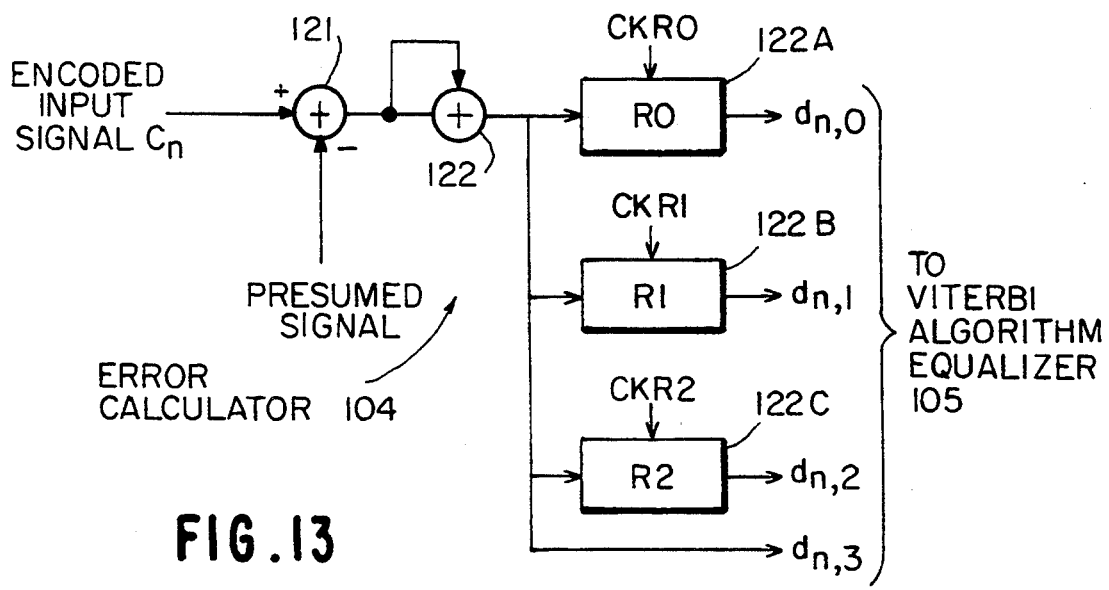
Figure 12:
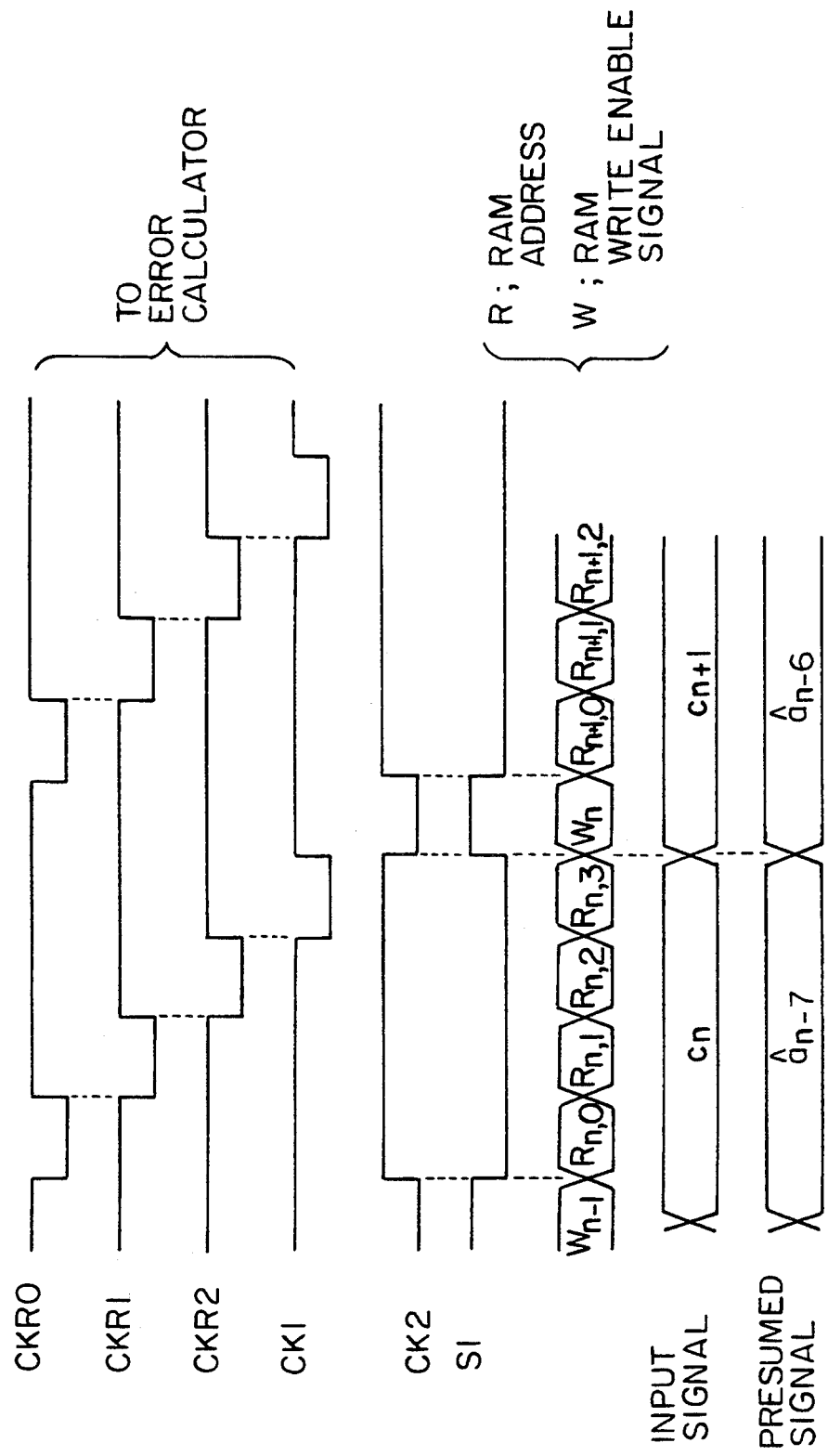
FIG. 12 shows the waveforms of signals appearing in various sections of the embodiment.

Referring also to FIG. 12, data symbols read out of the tape 17, i.e., the data symbols of the above-stated input digital signal undergone linear and nonlinear distortions are sequentially transformed to a binary signal $c_n$ representative of the analog values of the amplitudes of the input signal, i.e., read symbols by an amplitude encoder 106. As shown in FIG. 13, an error calculator 104 sequentially receives four presumed value signals from a presumed value table 101 and causes a subtractor 121 thereof to produce an error between each of the four presumed value signals and the input signal from an encoder 106. A squarer 122 squares each of the resulting four error signals from the subtractor 121. The squares from the squarer 122 are temporarily stored in registers 122A–122C and applied to a Viterbi algorithm equalizer 105 as branch metrics ($d_{n,0}$, $d_{n,1}$, $d_{n,2}$ and $d_{n,3}$).

Figure 14:
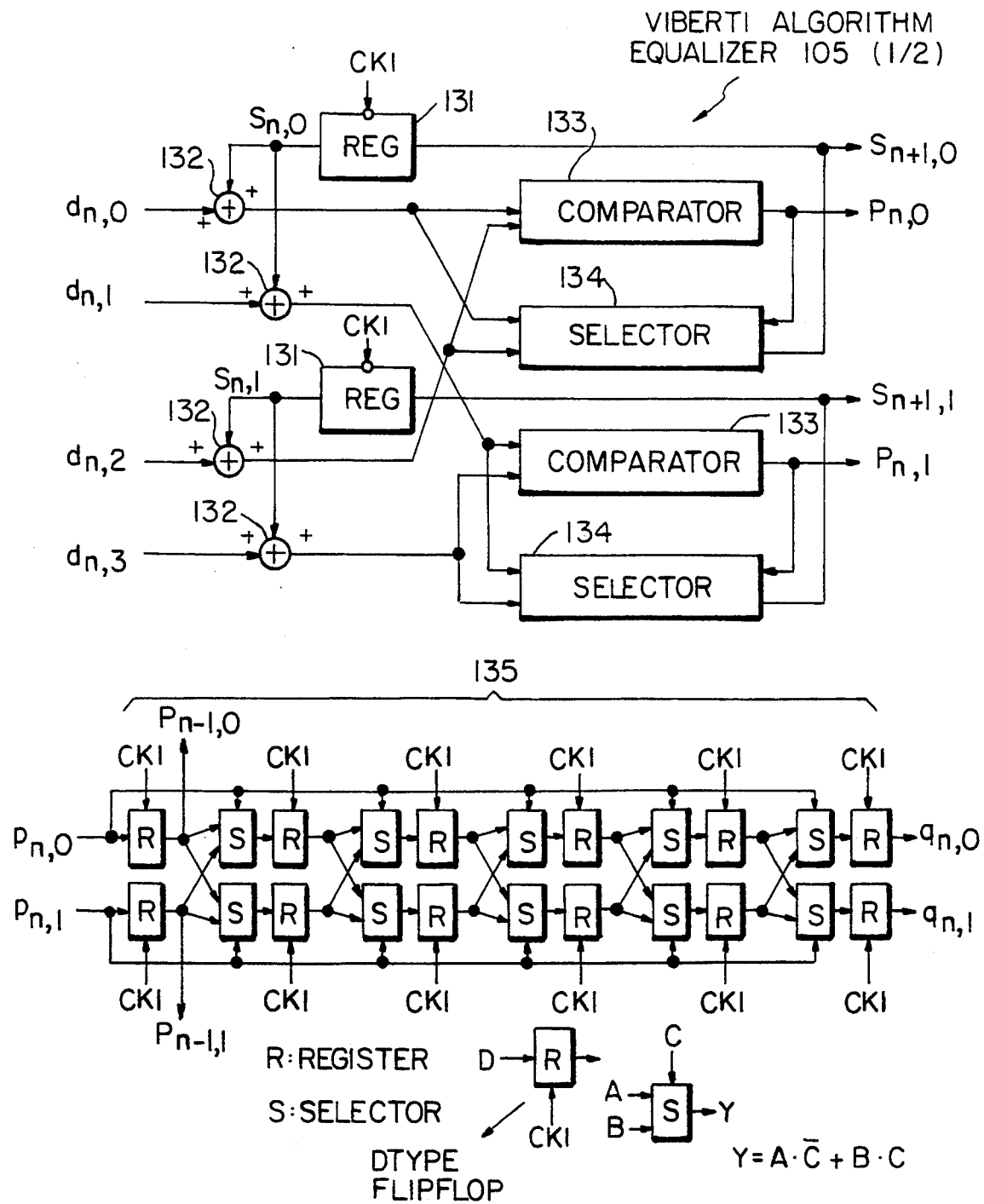

As shown in FIG. 14, the Viterbi algorithm equalizer 105 executes Viterbi decoding by using the outputs of the error calculator 104 and signals from registers 131 as branch metrics and path metrics, respectively, and according to a transition diagram shown in FIG. 16. In FIG. 16, $d_{n,0}$ ("n" and "0" of the suffix indicate time and branch metric state, respectively; for example, "0" indicates "00" while "3" indicates "11") to $d_{R,3}$ are the branch metrics corresponding to states "00" to "11" each consisting of a precursor component and a present component of impulse response. $S_{n,0}$ ("n" and "0" of the suffix indicate time and path metric state, respectively) to $S_{n,1}$ are the path metrics. A postcursor component of impulse response ("0" or "1") determined by a survived path corresponds to each of the path metrics and is used as an equalization address signal.

Referring again to FIG. 14, adders 132 add the path metrics from the associated registers 131 and the branch metrics. The outputs of the adders 132 are compared by associated comparators 133 while selectors 134 each selects smaller one of the associated sums and again stores it in the associated register 131. The comparators 133 each delivers a temporary determined value corresponding to the output of the selected adder 132 to each shift register 135 as an equalization address and, at the same time, replaces the content of the shift register 135 according to the Viterbi transition diagram shown in FIG. 16, whereby path history information is stored in the shift registers 135. As a result, equalization address signals ($P_{n-1,0}$ and $p_{n-1,1}$) are outputted while presumed data symbols of signals having been received and corresponding to two states are stored in the individual shift registers 135.

The trace-back procedure for Viterbi decoding will be described with reference to FIGS. 14 and 15. Assume that trace-back is effected over the past six consecutive symbols. To begin with, a comparator 136 compares the path metrics from the registers 131 to select one of them having the smallest value. Subsequently, a value stored in the shift register 135 corresponding to the register 131 having the smallest value and which appeared six symbols before ($q_{n,0}$ or $q_{n,1}$) is read out and outputted as the most probable presumed symbol $a_{n-7}$. The sequence of the past sixth to eighth symbols ($\hat{a}_{n-9}$, $\hat{a}_{n-8}$ and $\hat{a}_{n-7}$) are used as a correction address signal. The contents of the presumed value table 101 are corrected by use of the correction address signal ($\hat{a}_{n-9}$, $\hat{a}_{n-8}$ and $\hat{a}_{n-7}$) outputted by the Viterbi algorithm equalizer 105 and the correction value determined by a table corrector 102, as will be described later specifically.

Referring to FIG. 17, an address signal selector 103 selects the correction address signal ($\hat{a}_{n-9}$, $\hat{a}_{n-8}$ and $\hat{a}n-7$) from the Viterbi algorithm equalizer 105 or the equalization address signal ($P_{n-1,0}$ and $P_{n-1,1}$) and a 2-bit output of a counter 151 and sends them to the presumed signal table 101 as address signals. This selection is switched over by the timings of a signal $S_1$ shown in FIG. 12. It is to be noted that $P_{n-1,0}$ and $P_{n-1,1}$ and counter output have four different combinations in total i.e., $(P_{n-1}, 0, 0)$, $(P_{n-1}, 0, 1)$, $(P_{n-1}, 1, 0)$ and $(P_{n-1}, 1, 1)$.

Figure 9:
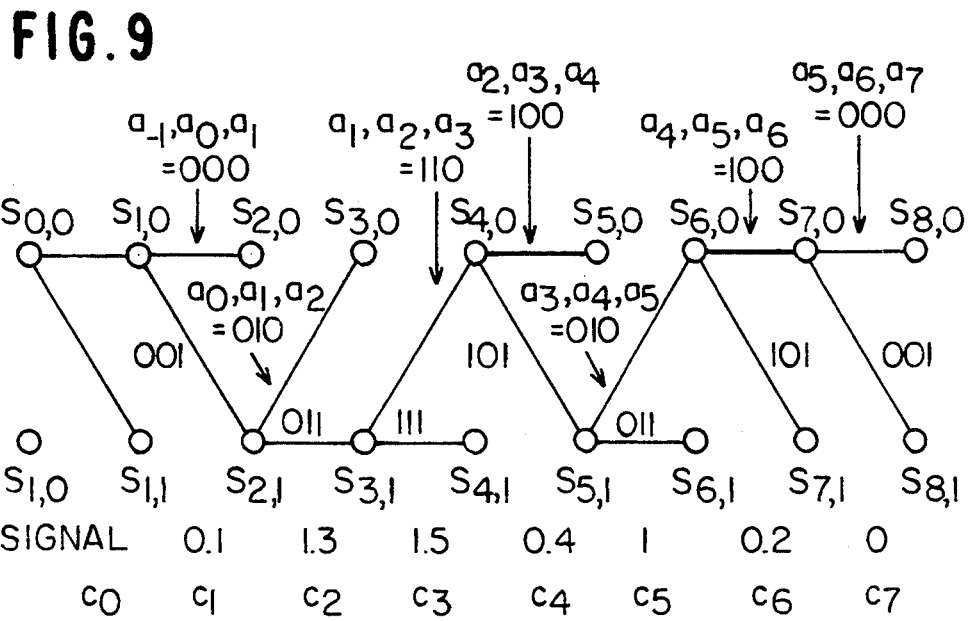
FIG. 9 shows a trellis transition diagram representative of the result of equalization effected by the invention according to a Viterbi algorithm.

Assume the transition diagram shown in FIG. 9 as a model. Let "0" and "0" correspond to the path metrics $S_{1,0}$ and $S_{1,1}$ as postcursor states. The postcursor state "0" of $S_{1,0}$ is outputted from $P_{n-1,0}$ of the Viterbi algorithm equalizer 105 as an equalization address signal. The address signal selector 103 delivers an address signal "000" to the presumed value table 101 on the basis of the equalization signal and the output "00" of the counter 151 of the address signal selector 103, so that the presumed value table 101 may output a presumed value to be used by the error calculator 104 for calculating $d_{1,0}$. Likewise, to determine $d_{1,1}$, the address signal selector 103 outputs "001" in response to the equalization address signal "0" and the output "01" of the counter 151. Thereafter, the address signal selector 103 sequentially outputs "010" and "011" meant for $d_{1,2}$ and $d_{1,3}$, respectively.

Implemented by a RAM, for example, the presumed value table 101 outputs a presumed value signal matching the address signal from the address signal selector 103. For example, assuming that the output of the address signal selector 103 is "011" then the presumed value table 101 produces a presumed value signal corresponding to a state wherein the precursor component, present symbol component and postcursor component of a received signal are "1", "1" and "0", respectively. Likewise, when the output of the address signal selector 103 is "010", the table 101 outputs a presumed value signal corresponding to a state wherein the precursor component, present symbol component and postcursor component are "0", "1" and "0" respectively. A specific construction of the presumed value table 101 is shown in FIG. 18.

To determine a path metric $S_{2,0}$, the Viterbi algorithm equalizer 105 compares $S_{1,0}+d_{1,0}$ and $S_{1,1}+d_{1,2}$ and selects a smaller one of them. Assume that the equalizer 105 has selected $S_{1,0}+d_{1,0}$. Then, the state of the postcursor component is "0" since the received signal of $d_{1,0}$ is assumed to be "0". Likewise, the state of the postcursor component of $S_{2,1}$ is "0" on the assumption that $d_{1,1}$ is selected. Such a procedure is repeated to calculate the path metrics and branch metrics to determine the states of postcursor component associated with the path metrics at consecutive times.

The trace-back procedure is as follows.

Every time the path metrics $S_{8,0}$ and $S_{8,1}$ are obtained, the comparator 136, FIG. 15, selects smaller one of them and then traces back over the past six symbols. Assume that the path of $d_{1,1}$ has been set up by the trace-back. The determined output symbol $â_0$ associated with $d_{1,1}$ is 0 since $â_0$ is assumed to be 0. The presumed value signal used to determine $d_{0,0}$ of the presumed value table 101 is corrected by the correction address signals $â_0$, $â_1$ and $â_2$.

Figure 19:
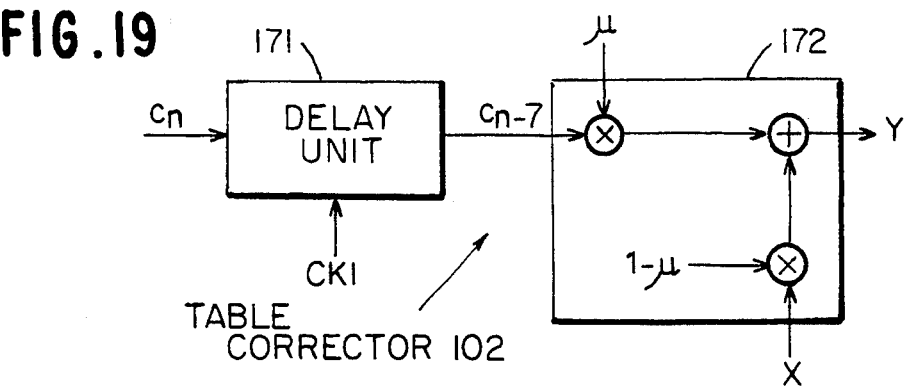

As shown in FIG. 19, the table corrector 102 includes a delay unit 171 which delays an input signal by seven symbols by a shift register. By such a delay, the output of the delay unit 171 and the correction address signal from the Viterbi algorithm equalizer 105 are synchronized. A calculator 172 performs a calculation with the output of the delay unit 171 and the output of the presumed value table 101 based on the correction address signal from the Viterbi algorithm equalizer 105 and thereby corrects the presumed value signal of the presumed value table 101. For the calculation, the following algorithm may be used:

$$D \leftarrow (1-\alpha) \times D + \alpha \times X \quad (1)$$

where D is the output of the presumed value table 101, $\alpha$ is the correction factor greater than or equal to 0 and smaller than or equal to 1, and X is the output of the delay unit 12.

With the above procedure, it is possible to equalize a received signal having suffered from nonlinear distortion by using three symbols in total, i.e., precursor component, present symbol component, and postcursor component.

Figure 20:
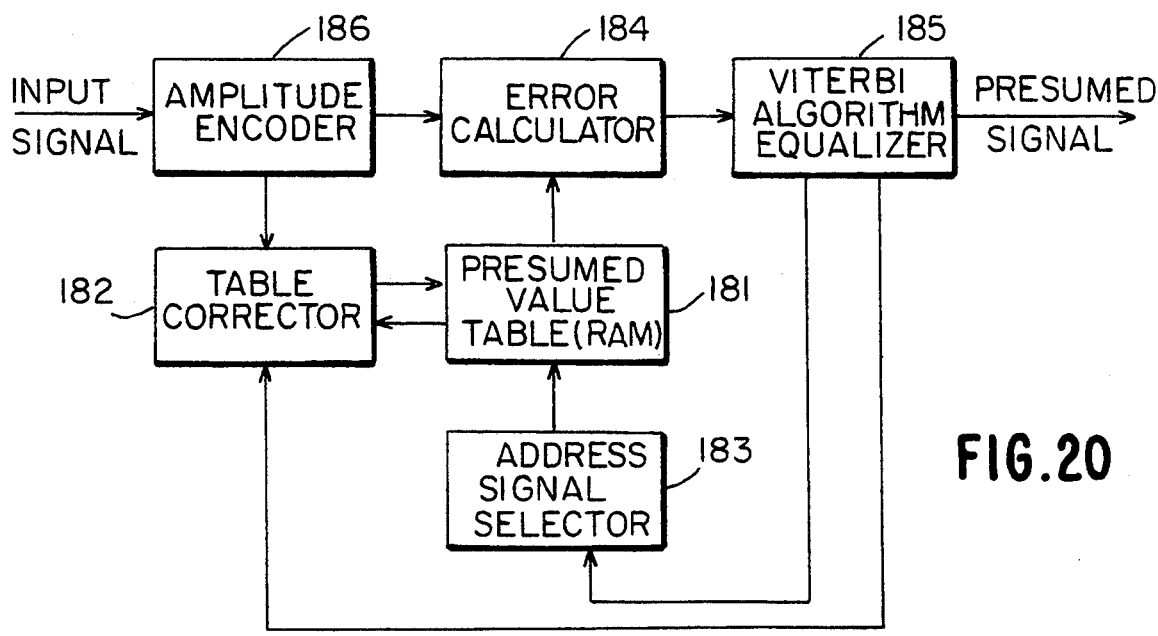
FIG. 20 is a block diagram schematically showing an alternative embodiment of the invention.

Referring to FIG. 20, an alternative embodiment of the present invention is shown. In this embodiment, a presumed value table 181 is made up of a plurality of storing sections while a table corrector 182 is so constructed as to receive the correction address signal directly from the Viterbi algorithm equalizer 185.

Figure 21:
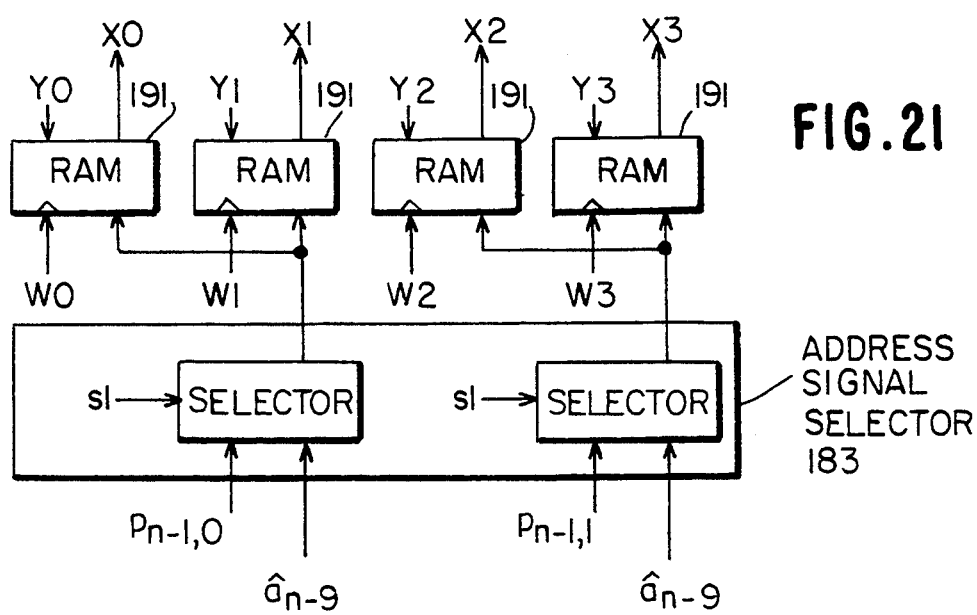
FIGS. 21, 22 and 23 are schematic block diagrams each showing part of the alternative embodiment.

FIG. 21 shows a specific construction wherein the presumed value table 181 is constituted by four RAMs 191. Each RAM 191 delivers to an error calculator 184 and the table corrector 182 presumed value signals corresponding to the states of precursor component, present symbol component and postcursor component of impulse response in parallel.

Figure 22:
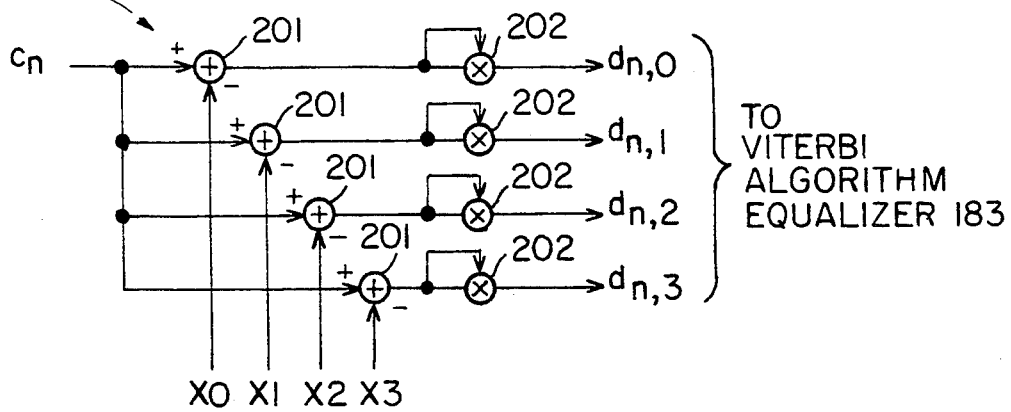

As shown in FIG. 22, the error calculator 184 has $2^2$ subtractors 201 and $2^2$ squarers 202. The subtractors 201 each produces a difference between the output of the associated storing section 191 and the input signal. The squarers 202 each squares the output of the associated subtractor 201 and delivers the square to a Viterbi algorithm equalizer 185 as a branch metric. The Viterbi algorithm equalizer 185 executes the same processing at the equalizer 105, FIG. 11, at the same timing as the equalizer 105 to thereby output the most probable presumed value, an equalization address, and a correction address signal.

Figure 23:
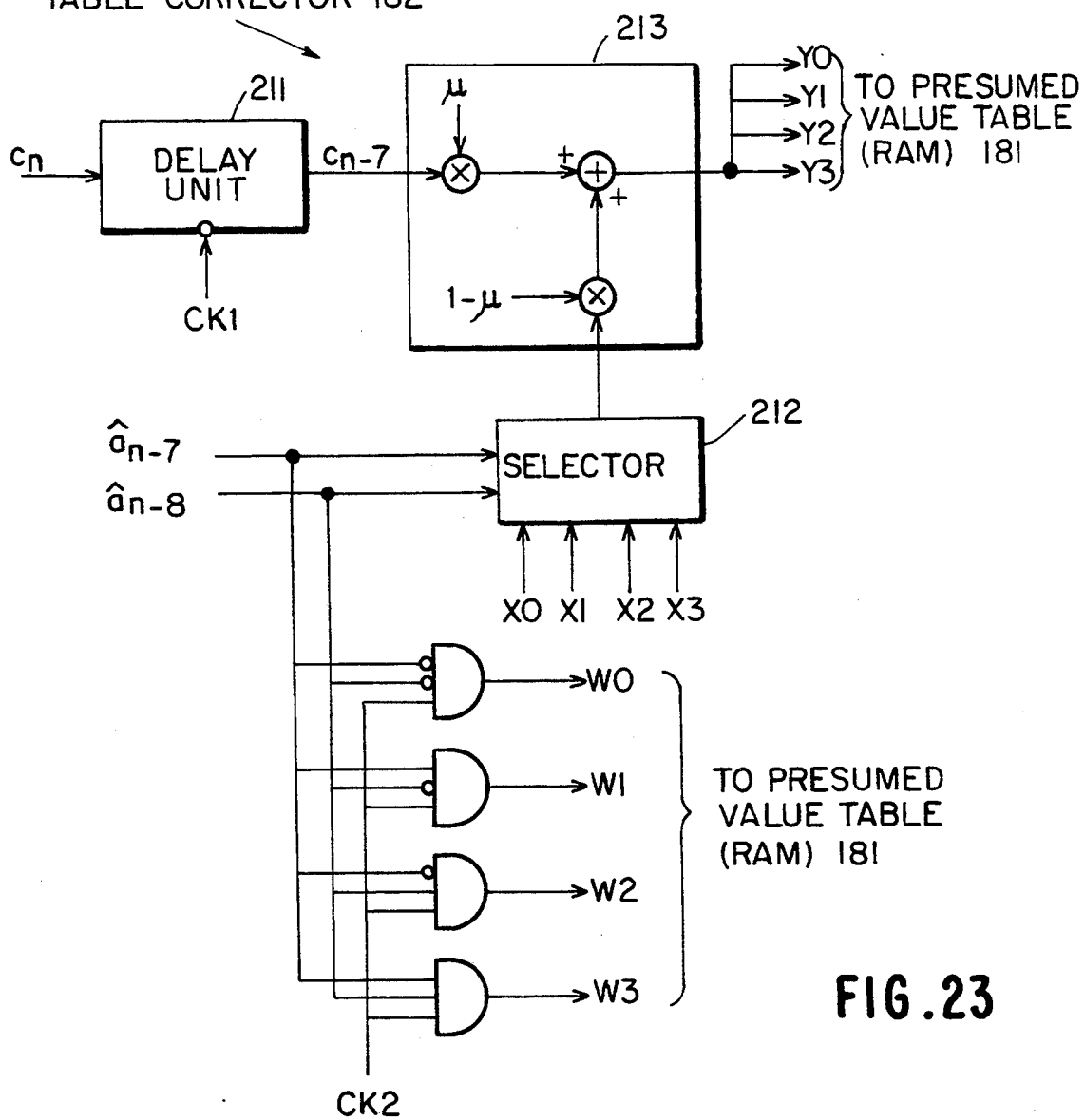

As shown in FIG. 23, the table corrector 182 has a delay unit 211 for delaying an input by seven symbols. Such a delay synchronizes the output of the delay unit 211 and the correction address signal from the Viterbi algorithm equalizer 185. Regarding the selection of a presumed value signal to be corrected, a selector 212 selects one of the outputs of the four RAMs 191 by using leading two symbols ($â_{n-7}$ and $â_{n-8}$) of the correction address signal from the Viterbi algorithm equalizer 185.

The outputs of the delay unit 211 and selector 212 are applied to a calculator 213 to correct the presumed value signal. The calculator 213 performs the correction with the previously stated algorithm (I). The outputs $Y_0-Y_3$ of the calculator 213 are written to one of the four storing sections 191 by write signals ($W_0$, $W_1$, $W_2$ and $W_3$) generated on the basis of $â_{n-7}$ and $â_{n-8}$ from the table corrector 182, whereby the presumed value signal is updated.

The above procedure is also successful in equalizing a received signal with nonlinear distortion by using three symbols in total, i.e., precursor component, present symbol component, and postcursor component.

In summary, it will be seen that the present invention reduces the number of branch metrics to four which is far smaller than conventional $2^3=8$ branch metrics, thereby reducing the amount of calculations while preserving an equalization effect comparable with the conventional Viterbi decoding.

The embodiments shown and described has assumed that the input digital signal from VTR is a binary data symbol sequence, that intersymbol interference involves a precursor component and a postcursor component each having a length of one symbol, and that the precursor and postcursor components are used as branch metrics for Viterbi decoding. However, it will be apparent that the present invention is practicable even with an M-level digital signal (M being an integer greater than or equal to 2), precursor and postcursor components each having a greater length, and branch metrics including postcursor components of any desired length.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any modifications or embodiments as fall within the true scope of the invention.

I claim:

1. An adaptive equalizer for equalizing an M-level (M being an integer greater than or equal to 2) input digital signal in which a nonlinear distortion exists due to intersymbol interference to cause an impulse response to extend over n data symbols (n being an integer greater or equal to 1), said equalizer comprising:
    an error calculator for producing a plurality of error signals each being representative of a difference between the input signal and one of $M^m$ (m being an integer greater than or equal to 1 and smaller than or equal to n) presumed value signals corresponding to said input signal;
    a Viterbi algorithm equalizer for equalizing a symbol sequence having a length of n symbols by using said plurality of error signals as branch metrics and according to a Viterbi algorithm to thereby output an equalized presumed symbol associated with said input signal, while outputting a path history having a length of n-m symbols of a Viterbi transition diagram as an equalization address signal;
    an address signal selector for sequentially outputting addresses of said $PF^n$ presumed value signals consisting of said equalization address signal and a transition symbol sequence having a length of m symbols; and
    a presumed value table for sequentially receiving said addresses of said $M^m$ presumed value signals from said address signal selector to in turn sequentially feed said $M^m$ presumed value signals corresponding to said addresses to said error calculator.

2. An adaptive equalizer for equalzing an M-level (M being an integer greater than or equal to 2) input digital signal in which a nonlinear distortion exists due to intersymbol interference to cause an impulse response to extend over n data symbols (n being an integer greater or equal to 1), said equalizer comprising:
    an error calculator for producing a plurality of error signals each being representative of a difference between the input signal and one of $M^m$ (m being an integer greater than or equal to 1 and smaller than or equal to n) presumed value signals corresponding to said input signal;
    a Viterbi algorithm equalizer for equalizing a symbol sequence having a length of n symbols by using said plurality of error signals as branch metrics and according to a Viterbi algorithm to thereby output an equalized presumed symbol associated with the input signal, outputting a path history having a length of n-m symbols of a Viterbi transition diagram as an equalization address signal, and outputting a correction address signal associated with a first presumed value signal to be corrected;
    an address signal selector for selecting either of said equalization address signal and said correction address signal and, when selected said equalization address signal, sequentially outputting addresses of said Mm presumed value signals consisting of an equalization address signal based on the Viterbi transition diagram and a transition symbol sequence having a length of m symbols;
    a corrector for processing said input signal and said first presumed value signal according to a predetermined algorithm to thereby produce a second presumed value signal; and
    a presumed value table for sequentially outputting same $M^m$ presumed value signals corresponding to said addresses to said error calculator in response to said addresses, feeding said first presumed value signal to said corrector in response to said correction address signal received from said address signal selector, and updating said first presumed value signal based on said correction address signal in response to said second presumed value signal.

3. An adaptive equalizer for equalizing an M-level (M being an integer greater than or equal to 2) input digital signal in which a nonlinear distortion exists due to intersymbol interference to cause an impulse response to extend over n data symbols (n being an integer greater or equal to 1), said equalizer comprising:
    an error calculator for producing a plurality of error signals each being representative of a difference between the input signal and one of $M^m$ (m being an integer greater than or equal to 1 and smaller than or equal to n) presumed value signals corresponding to said input signal;
    a Viterbi algorithm equalizer for equalizing a symbol sequence having a length of n symbols by using said plurality of error signals as branch metrics and according to a Viterbi algorithm to thereby output an equalized presumed symbol associated with said input signal, while outputting a path history having a length of n-m symbols of a Viterbi transition diagram as an equalization address signal; and
    a presumed value table comprising $M^m$ storing sections addressed by n-m symbols for feeding, in response to said equalization address signal, said equalization address signal from said $M^m$ storing sections to said error calculator as addresses.

4. An adaptive equalizer for equalizing an M-level (M being an integer greater than or equal to 2) input digital signal in which a nonlinear distortion exists due to intersymbol interference to cause an impulse response to extend over n data symbols (n being an integer greater or equal to 1), said equalizer comprising:
    an error calculator for producing a plurality of error signals each being representative of a difference between the input signal and one of $M^m$ (m being an integer greater than or equal to 1 and smaller than or equal to n) presumed value signals corresponding to said input signal;
    a Viterbi algorithm equalizer for equalizing a symbol sequence having a length of n symbols by using said plurality of error signals as branch metrics and according to a Viterbi algorithm to thereby output an equalized presumed symbol associated with said input signal, outputting a path history having a length of n-m symbols of a Viterbi transition diagram as an equalization address signal, and outputting a correction address signal associated with a first presumed value signal to be connected;

an address signal selector for outputting said equalization address signal and said correction address signal;

a presumed signal table comprising $M^m$ storing sections addressed by n-m symbols for feeding, in response to said equalization address signal from said address signal selector, said $M^m$ presumed value signals from said $M^m$ storing sections to said error calculator in parallel as addresses, feeding, in response to said correction address signal from said address signal selector, the presumed value signals selected by upper m symbols of said correction address signal from said $M^m$ storing sections addressed by lower n-m symbols of said correction address signal to a corrector, and updating said first presumed value signal on the basis of said correction address signal in response to a second presumed value signal; and said corrector for selecting said first presumed value signal out of $(M^{m+1})$ presumed value signals on the basis of said correction address signal, and outputting said second presumed value signal by using said input signal and said first presumed value signal and according to a predetermined algorithm.

5. An equalizer as claimed in any one of claims 1, 2, 3 or 4, wherein said input signal comprises a binary digital signal (i.e. M=2), the n and the m being 3 and 2, respectively.

* * * * *

UNITED STATES PATENT AND TRADEMARK OFFICE
CERTIFICATE OF CORRECTION

PATENT NO. : 5,345,452

DATED : September 6, 1994

INVENTOR(S) : MATUI

It is certified that error appears in the above-identified patent and that said Letters Patent is hereby corrected as shown below:

Col. 4, line 27, delete "$an_{-1}$" and insert --$a_{n-1}$--.

Col. 6, line 63, delete "$ân-7$" and insert --$â_{n-7}$--.

Col. 7, line 2, delete "$P_{n-1o}$" and insert --$P_{n-1,o}$--.

Col. 9, line 46, delete "PF" and insert --$M^m$--.

Signed and Sealed this

Twenty-first Day of February, 1995

Attest:

BRUCE LEHMAN

Attesting Officer

Commissioner of Patents and Trademarks